US012559622B2

(12) United States Patent
Venderbosch et al.

(10) Patent No.: US 12,559,622 B2
(45) Date of Patent: Feb. 24, 2026

(54) COMPOSITION COMPRISING POLYESTER AND POLYOLEFIN

(71) Applicant: SABIC GLOBAL TECHNOLOGIES B.V., Bergen op Zoom (NL)

(72) Inventors: Robert Walter Venderbosch, Bergen op Zoom (NL); Rob Boonman, Oosterhout (NL); Johannes Peter Antonius Martens, Geleen (NL); Karin Irene van de Wetering, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 939 days.

(21) Appl. No.: 17/767,741

(22) PCT Filed: Oct. 9, 2020

(86) PCT No.: PCT/EP2020/078514
§ 371 (c)(1),
(2) Date: Apr. 8, 2022

(87) PCT Pub. No.: WO2021/069727
PCT Pub. Date: Apr. 15, 2021

(65) Prior Publication Data

US 2024/0101811 A1 Mar. 28, 2024

(30) Foreign Application Priority Data

Oct. 11, 2019 (EP) .................................... 19202735

(51) Int. Cl.
*C08L 67/02* (2006.01)
*C08G 63/183* (2006.01)

(52) U.S. Cl.
CPC ............ *C08L 67/02* (2013.01); *C08G 63/183* (2013.01)

(58) Field of Classification Search
CPC ....... C08G 63/183; C08G 77/04; C08L 23/08; C08L 23/0807; C08L 23/0815; C08L 23/0823; C08L 23/0869; C08L 23/0876; C08L 23/0884; C08L 23/26; C08L 67/02; C08L 83/04
See application file for complete search history.

(56) References Cited

U.S. PATENT DOCUMENTS

| | | | | |
|---|---|---|---|---|
| 5,017,714 | A | 5/1991 | Welborn, Jr. | |
| 5,324,820 | A | 6/1994 | Baxter | |
| 5,618,881 | A | 4/1997 | Hojabr | |
| 2006/0287441 | A1 | 12/2006 | Miyama et al. | |
| 2011/0202028 | A1 | 8/2011 | Toro et al. | |
| 2019/0249003 | A1 * | 8/2019 | Osano | C08L 67/02 |

FOREIGN PATENT DOCUMENTS

| | | | |
|---|---|---|---|
| CN | 105504706 | A | 4/2016 |
| CN | 106380760 | A | 2/2017 |
| CN | 107629422 | A | 1/2018 |
| JP | H05311035 | A * | 11/1993 |
| WO | 2018144242 | A1 | 8/2018 |
| WO | 2019185575 | A1 | 10/2019 |

OTHER PUBLICATIONS

JP H05311035 A machine translation (Nov. 22, 1993).*
International Search Report for International Application No. PCT/EP2020/078514, International Filing Date Oct. 9, 2020, Date of Mailing Nov. 20, 2020, 5 pages.
Peacock Andrew J., "Handbook of Polyethylene", Chapter 3 Production Processes, 2000, Marcel Dekker, Inc., New York; ISBN 0824795466; p. 43-66.
Written Opinion for International Application No. PCT/EP2020/078514, International Filing Date Oct. 9, 2020, Date of Mailing Nov. 20, 2020, 18 pages.

* cited by examiner

*Primary Examiner* — Ana L. Woodward
(74) *Attorney, Agent, or Firm* — CANTOR COLBURN LLP

(57) ABSTRACT

The invention relates to a composition comprising A) a first polyester, B) a first polyolefin, C) a compatibilizer and D) a lubricant, wherein D) comprises a siloxane polymer having a viscosity of at least 10000 cSt and an optional second polyester and/or an optional second polyolefin, the total amount of A) and B) with respect to the total composition is at least 80 wt %, the amount of C) with respect to the total composition is 0.1 to 15 wt % and the amount of D) with respect to the total composition is 0.1 to 5.0 wt %.

20 Claims, No Drawings

COMPOSITION COMPRISING POLYESTER AND POLYOLEFIN

CROSS REFERENCE TO RELATED APPLICATIONS

This application is a National Stage application of PCT/EP2020/078514, filed Oct. 9, 2020, which claims the benefit of European Application No. 19202735.7, filed Oct. 11, 2019, both of which are incorporated by reference in their entirety herein.

The present invention relates to a composition comprising a polyester and a polyolefin. The invention further relates to a process for making such composition, an article comprising such composition and use of such composition for making an article.

The most common material for making articles that fit together when combined, such as a stud and a receptacle, is polycarbonate (PC) or acrylonitrile butadiene styrene (ABS). PC and ABS consist of components such as bisphenol A (BPA), acrylonitrile (AN), styrene (S) and butadiene (BD), for which alternative solutions are sought for environmental reasons and because they are under debate as they are associated with health risks.

In articles in which repetitive clicking on/off is needed, the friction resistance should not be too high to avoid requiring too much energy for clicking on/off. The article desirably has an appropriate level of friction resistance in combination with other desirable mechanical properties such as low shrinkage, high impact strength and high tensile modulus. It may be desirable to further have a high glossiness in some applications.

It is an objective of the invention to solve the above-described and/or other problems.

Accordingly, the invention provides a composition comprising A) a first polyester, B) a first polyolefin, C) a compatibilizer and D) a lubricant, wherein D) comprises a siloxane polymer having a viscosity of at least 10000 cSt and an optional second polyester and/or an optional second polyolefin, the total amount of A) and B) with respect to the total composition is at least 80 wt %, the amount of C) with respect to the total composition is 0.1 to 15 wt % and the amount of D) with respect to the total composition is 0.1 to 5.0 wt %.

It was surprisingly found that the composition according to the invention has an appropriate level of friction resistance in combination with other desirable mechanical properties such as low shrinkage, high impact strength and high tensile modulus.

The viscosity of the siloxane polymer is herein measured by ASTM D445.

Blends of a polyester and a polyolefin are known, e.g. from US2006287441, which discloses a method for manufacturing a resin composition from a raw material composition containing a polyester resin, a polyolefin resin and a compatibilizer. The process comprises a kneading step for kneading the raw material composition in the presence of moisture. The resin composition does not comprise a lubricant comprising a siloxane polymer having a viscosity of at least 10000 cSt.

A) First Polyester

The amount of A) with respect to the total composition is typically 5 to 95 wt %.

Preferably, the amount of A) with respect to the total composition is greater than the amount of B) with respect to the total composition.

Preferably, the amount of A) with respect to the total composition is at least 50 wt %, more preferably at least 75 wt %. For example, the amount of A) with respect to the total composition is 75 to 94 wt %, 80 to 94 wt % or 85 to 92 wt %.

Typically polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (VIII)

(VIII)

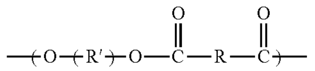

wherein, R' is an alkyl radical compromising a dehydroxylated residue derived from an aliphatic or cycloaliphatic diol, or mixtures thereof, containing from 2 to about 20 carbon atoms. R is an aryl radical comprising a decarboxylated residue derived from an aromatic dicarboxylic acid. In one embodiment of the present invention the polyester could be an aliphatic polyester where at least one of R' or R is a cycloalkyl containing radical. The polyester is a condensation product where R' is the residue of an aryl, alkane or cycloalkane containing diol having 6 to 20 carbon atoms or chemical equivalent thereof, and R is the decarboxylated residue derived from an aryl, aliphatic or cycloalkane containing diacid of 6 to 20 carbon atoms or chemical equivalent thereof. The polyester resins are typically obtained through the condensation or ester interchange polymerization of the diol or diol equivalent component with the diacid or diacid chemical equivalent component.

R' and R are preferably cycloalkyl radicals independently selected from the following structure IX:

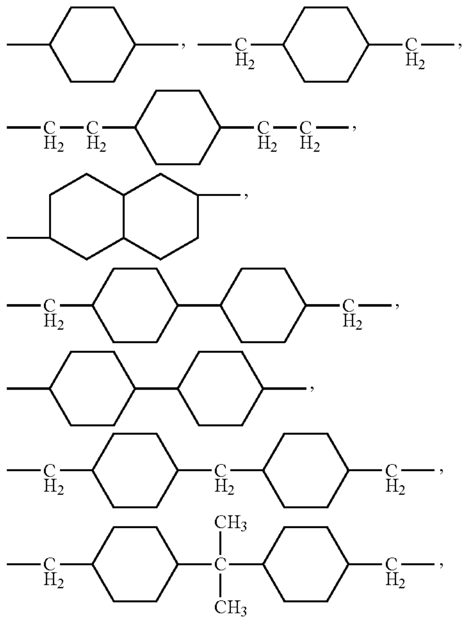

-continued

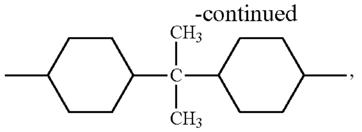

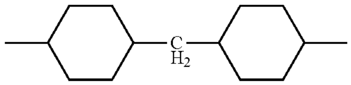

The diacids meant to include carboxylic acids having two carboxyl groups each useful in the preparation of the polyester resins of the present invention are preferably aliphatic, aromatic, cycloaliphatic. Examples of diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or a chemical equivalent. Linear dicarboxylic acids like adipic acid, azelaic acid, dicarboxyl dodecanoic acid, and succinic acid may also be useful. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue R may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Some of the diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably, a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters, and the like. Typically the polyester resin may comprise one or more resins selected from linear polyester resins, branched polyester resins and copolymeric polyester resins.

A preferred cycloaliphatic polyester is poly (cyclohexane-1,4-dimethylene cyclohexane-1,4-dicarboxylate) also referred to as poly (1,4-cyclohexane-dimethanol 1,4-dicarboxylate) (PCCD) which has recurring units of formula X:

Preferably, the polyester is derived from structural units comprising at least one substituted or unsubstituted aliphatic diols, and/or substituted or unsubstituted cycloaliphatic diol and at least one substituted or unsubstituted aromatic dicarboxylic acid or substituted or unsubstituted aliphatic dicarboxylic acid.

Preferably, the polyester is at least one selected form a group consisting of poly(alkylene phthalate)s, poly(cycloalkylene phthalate)s, poly(alkylene dicarboxylate)s, ester-amide copolymers, copolyesters derived from structural units comprising at least one alkyl diol, or cycloaliphatic diol, and at least one aromatic acid, aliphatic acids and cycloaliphatic acids.

Particularly preferably, the polyester comprises polyethylene terephthalate (PET), polybutylene terephthalate (PBT) and/or polycyclohexylenedimethylene terephthalate. Preferably, the polyester comprises PET. Preferably, the polyester in the composition according to the invention consists of PET.

The first polyester may be in the form of unused pellet products or recycled (processed) products in the form of flake, pellet or powder, which may be derived e.g. from PET bottles. Preferably, the polyester is a recycled polyester, in particular a recycled PET, for example derived from PET bottles. Preferably the polyester, in particular PET, is dried before being mixed with other components of the composition according to the invention.

The first polyester may be bio-based, i.e. the polyester may be a polyester produced from materials or products derived from or made using biological raw materials. Such materials are renewable and are typically obtained from or produced by living organisms such as, for example, plants, trees, algae, bacteria, yeast, fungi, protozoa, insects, animals, and the like. Processes for obtaining diacids from such biomaterials are known to those of skill in the art. Biobased or bioderived difunctional acids are preferred because of a lower ecological footprint associated with production and use of such materials.

Preferably, the first polyester, in particular PET, has an intrinsic viscosity (IV) of 0.1 to 1.0 dl/g, for example 0.5 to 0.9 dl/g, as determined by according to ASTM D4603.

Preferably, the first polyester, in particular PET, has a melt volume index (MVI) of 5 to 100 dg/min, for example 10 to 50 dg/min, according to ISO 1133 (2.16 kg, 280° C.).

Preferably, the first polyester, in particular PET, has a density of at most 1.35 g/$cm^3$ as determined according to ISO 1183. This indicates a lower crystallinity of the polyester, in particular PET, which leads to desirable properties of the final composition.

B) First Polyolefin

The amount of B) with respect to the total composition is typically 5 to 95 wt %.

Preferably, the amount of B) with respect to the total composition is at most 40 wt %, more preferably at most 35 wt %. For example, the amount of the first polyolefin with (X)

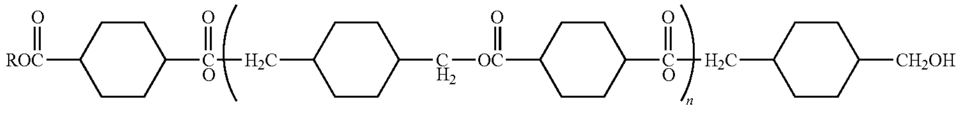

respect to the total composition is 5 to 22.5 wt %, 5 to 20 wt %, preferably 6 to 18 wt % or 8 to 15 wt %.

The total amount of A) and B) with respect to the total composition is at least 80 wt % and at most 99.8 wt % with respect to the total composition. Preferably, the total amount of A) and B) with respect to the total composition is at least 85 wt %, at least 90 wt %, at least 95 wt %, at least 97 wt % or at least 99 wt %, with respect to the total composition.

Examples of the first polyolefin include low density polyethylene (LDPE), linear low density polyethylene (LLDPE) and high density polyethylene (HDPE); polypropylene (PP) and an elastomeric copolymer of ethylene and an α-olefin having 4 to 10 carbon atoms.

The first polyolefin may have a density of 0.850 to 0.970 $g/cm^3$ determined according to ISO1183.

LDPE, LLDPE and HDPE

The production processes of LDPE, LLDPE and HDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group 1-Ill metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

LDPE

The LDPE may be an ethylene homopolymer or may comprise a comonomer, for example butene or hexene.

Preferably, the LDPE has a density of 0.916 to 0.940 $g/cm^3$, more preferably 0.920 to 0.930 $g/cm^3$, determined according to ISO1183.

Preferably, the LDPE has a Melt flow index of 0.1 to 10.0 g/10 min, more preferably 1.0 to 5.0 g/10 min, determined according to ASTM D1238 (190° C./2.16 kg).

The LDPE may be produced by use of autoclave high pressure technology or by tubular reactor technology.

In some embodiments, the polyolefin in the composition according to the invention is an LDPE having a density of 0.916 to 0.940 $g/cm^3$ determined according to ISO1183 and a Melt flow index of 0.1 to 10.0 g/10 min determined according to ASTM D1238 (190° C./2.16 kg) and the amount of the LDPE in the composition is 5 to 15 wt %. Such composition may have a high gloss, a high MVR and a high tensile modulus while having acceptable impact strength and shrinkage.

LLDPE

The LLDPE may be an ethylene homopolymer or may be a polyethylene copolymer comprising ethylene and a C3-C10 alpha-olefin comonomer (ethylene-alpha olefin copolymer). Suitable alpha-olefin co monomers include 1-butene, 1-hexene, 4-methyl pentene and 1-octene. The preferred comonomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the density of the LLDPE may range between 0.915 $g/cm^3$ and 0.940 $g/cm^3$, preferably 0.930 to 0.940 $g/cm^3$, determined according to ISO1183.

Preferably, the melt flow index of the LLDPE ranges from 0.1 to 5.0 g/10 min, for example from 0.5 to 4.0 g/10 min, for example from 1.0 to 3.0 g/10 min, determined according to ASTM D1238 (190° C./2.16 kg).

The technologies suitable for the LLDPE manufacture include but are not limited to gas-phase fluidized-bed polymerization, polymerization in solution, and slurry polymerization.

According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

In some embodiments, the polyolefin in the composition according to the invention is an LLDPE having a density of 0.915 to 0.940 $g/cm^3$ determined according to ISO1183 and a Melt flow index of 0.1 to 5.0 g/10 min determined according to ASTM D1238 (190° C./2.16 kg) and the amount of the LLDPE in the composition is 5 to 15 wt %. Such composition may have a high MVR and a high tensile modulus while having acceptable gloss, impact strength and shrinkage.

HDPE

HDPE may be an ethylene homopolymer or may comprise a comonomer, for example butene or hexene.

Preferably, the HDPE has a density of 0.940 to 0.970 $g/cm^3$, more preferably 0.950 to 0.965 $g/cm^3$, determined according to ISO1183.

Preferably, the HDPE has a Melt flow index of 0.1 to 15.0 g/10 min, more preferably 1.0 to 10.0 g/10 min, measured according to ASTM D1238 (190° C./5 kg).

In some embodiments, the polyolefin in the composition according to the invention is an HDPE having a density of 0.940 to 0.970 $g/cm^3$ determined according to ISO1183 and a Melt flow index of 0.1 to 15.0 g/10 min determined according to ASTM D1238 (190° C./2.16 kg) and the amount of the HDPE in the composition is 5 to 15 wt %. Such composition may have a high gloss, a high MVR, a high tensile modulus and a low shrinkage while having acceptable impact strength.

PP

With polypropylene as used herein is meant propylene homopolymer or a copolymer of propylene with an α-olefin, for example an α-olefin chosen from the group of α-olefin having 2 or 4 to 10 C-atoms, for example ethylene, for example wherein the amount of α-olefin is less than 10 wt % based on the total propylene copolymer.

Polypropylene can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Preferably, the tensile modulus of the PP ranges from 800 to 1800 MPa, determined according to ASTM D790A.

Preferably, the melt flow index of the PP as determined using ASTM D1238 (230° C./2.16 kg) ranges from 0.3 to 50 dg/min.

Elastomeric Copolymer

The polyolefin may be an elastomeric copolymer of ethylene and an α-olefin having 4 to 10 carbon atoms. The α-olefin comonomer in the elastomeric copolymer is preferably an acyclic monoolefin such as 1-butene, 1-pentene, 1-hexene, 1-octene or 4-methylpentene. Most preferably, the elastomeric copolymer is an ethylene-1-octene copolymer.

Preferably, the elastomeric copolymer has a density of 0.850 to 0.910 g/cm$^3$. Preferably, the density of the elastomeric copolymer is 0.865 to 0.910 g/cm$^3$, for example 0.865 to 0.875 g/cm$^3$ according to ASTM D792.

Preferably, the elastomeric copolymer has a melt flow index of 1.0 to 10.0 dg/min, for example 3.0 to 8.0 dg/min, measured in accordance with ASTM D1238 using a 2.16 kg weight and at a temperature of 190° C.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the amount of ethylene in the elastomer is at least 50 mol %. More preferably, the amount of ethylene in the elastomer is at least 57 mol %, for example at least 60 mol %, at least 65 mol % or at least 70 mol %. Even more preferably, the amount of ethylene in the elastomer is at least 75 mol %. The amount of ethylene in the elastomer may typically be at most 97.5 mol %, for example at most 95 mol % or at most 90 mol %.

In some embodiments, the polyolefin in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 5 to 15 wt %. Such composition may have a high gloss, a high MVR, a high tensile modulus, a high impact strength and a low shrinkage.

In some embodiments, the polyolefin in the composition according to the invention is an elastomeric copolymer of ethylene and an α-olefin having 4 to 10 carbon atoms having a density of 0.850 to 0.910 g/cm$^3$ determined according to ASTM D792 and a Melt flow index of 1.0 to 10.0 g/10 min determined according to ASTM D1238 (190° C./2.16 kg) and the amount of the elastomeric copolymer in the composition is 15 to 25 wt %. Such composition may have a high gloss, an extremely high impact strength and a low shrinkage while having acceptable MVR and tensile modulus.

C) Compatibilizer

The role of the compatibilizer is to decrease the interfacial tension between the immiscible blends of the polar polyester phase and the a-polar polyolefin phase. Addition of the compatibilizer improves adhesion between both phases and stabilizes the morphology of the polyester/polyolefin composition against coalescence, resulting in improved mechanical properties compared to the polyester/polyolefin composition without a compatibilizer.

The compatibilizer may comprise a copolymer of ethylene and a comonomer selected from the group consisting of an unsaturated carboxylic acid such as acrylic acid, methacrylic acid, maleic acid, fumaric acid and itaconic acid, and its anhydrate;

ester of unsaturated carboxylic acid such as methyl acrylate, methyl methacrylate, dimethyl maleate, monomethyl maleate, diethyl fumarate, dimethyl itaconate, diethyl citraconate and dimethyl tetrahydro phthalic acid;

glycidylester of unsaturated monocarboxylic acid such as glycidylacrylate, glycidylmethacrylate and glycidyl p-styryl carboxylate;

monoglycidylester or polyglycidylester of unsaturated polycarboxylic acid such as maleic acid, itaconic acid, citraconic acid and butenetricarboxylic acid; and unsaturated glycidylether such as allylglycidylether, 2-methylallylglycidylether and glycidylether of o-allylphenol.

The compatibilizer may comprise a random terpolymer of ethylene, butylacrylate and maleic anhydride.

The compatibilizer may comprise an ethylene-acrylate copolymer which includes an acrylate represented by formula (I) or (II) as a comonomer:

$$CH_2{=}CR^1{-}COO{-}(CH_2)_n{-}OH \quad (I)$$

$$CH_2{=}CR^1{-}COO{-}(CH_2)_m{-}CHOH{-}CH_2OH \quad (II)$$

wherein $R^1$ is H or C1-C5 linear or branched alkyl, n is an integer of 1-10 and m is an integer of 0-10.

The amount of C) with respect to the total composition is 0.1 to 15 wt %, for example 0.2 to 12 wt %, 0.3 to 10 wt %, 0.5 to 5 wt %. A lower amount of compatibilizer leads to a lower shrinkage and therefore the amount of C) in the composition is preferably 0.75 to 4 wt %, more preferably 1 to 3 wt %, even more preferably 1 to 2 wt %.

Preferably, the weight ratio of the amount of B) with respect to the amount of C) is 2 to 20, 2 to 15 or 3 to 10.

Particularly preferred compatibilizer is a copolymer of ethylene and glycidylmethacrylate, commercially available as Lotader AX8840.

Preferably, the total amount of A), B) and C) is at least 90 wt %, at least 92 wt %, at least 95 wt %, at least 98 wt %, at least 99 wt % or at least 99.9 wt %.

D) Lubricant

The lubricant comprises a siloxane polymer having a viscosity of at least 10000 cSt as measured by ASTM D445. Such viscosity ensures the lubrication effect to be maintained over time resulting in constant clutch behavior over time. Preferably, the viscosity of the siloxane polymer is at most 15,000,000 cSt. The effect of the lubricant generally increases with the amount of the lubricant, but the increase in the effect may no longer be observed after the amount of the lubricant reaches a certain value. When the viscosity of the siloxane polymer is not too high, it was found that the increase in the effect is still observed at higher amounts. Preferably, the viscosity of the siloxane polymer is at least 15000 cSt or at least 20000 cSt and/or at most 1,000,000 cSt, at most 500,000 cSt, at most 100,000 cSt or at most 50000 cSt.

The lubricant may further comprise a second polyester and/or a second polyolefin. The presence of such second polyester and/or second polyolefin allows the lubricant to be easier to process and easier to feed to the compounders for mixing components of the composition according to the invention.

The type of the second polyester is not limited. Suitable examples of the second polyester include those described for the first polyester. When present, the second polyester may be the same type as the first polyester or different type from the first polyester.

The type of the second polyolefin is not limited. Suitable examples of the second polyolefin include those described for the first polyolefin. When present, the second polyolefin may be the same type as the first polyolefin or different type from the first polyolefin. Preferably, the second polyolefin is the same type as the first polyolefin, which gives an improved miscibility. For example, when the first polyolefin is selected from low density polyethylene (LDPE), linear low density polyethylene (LLDPE), high density polyethylene (HDPE) and an elastomeric copolymer of ethylene and an α-olefin having 4 to 10 carbon atoms, the second polyolefin is preferably selected from low density polyethylene (LDPE), linear low density polyethylene (LLDPE), high density polyethylene (HDPE) and an elastomeric copolymer of ethylene and an α-olefin having 4 to 10 carbon atoms. When the first polyolefin is polypropylene, the second polyolefin is preferably polypropylene.

The amount of D) with respect to the total composition is 0.1 to 5.0 wt %, for example 0.1 to 1.0 wt %, 1.0 to 2.0 wt %, 2.0 to 3.0 wt %, 3.0 to 4.0 wt % or 4.0 to 5.0 wt %, with respect to the total composition. Preferably, the amount of D) with respect to the total composition is 0.5 to 2.5 wt % with respect to the total composition.

Preferably, the siloxane polymer is selected from polyalkylsiloxanes, polyarylsiloxanes, polyalkylarylsiloxanes. More preferably, the siloxane polymer is polydimethylsiloxane.

Examples of preferred lubricants include Accurel Si707, Accurel Si726, Accurel Si728, Accurel Si735, Accurel Si754 and Accurel 18CM2565. Genioplast S may also be used as the lubricant.

In some embodiments, D) consists of the siloxane polymer. In some embodiments, D) consists of the siloxane polymer and the second polyester. In some embodiments, D) consists of the siloxane polymer and the second polyolefin. In some embodiments, D) may comprise components other than the siloxane polymer, the optional second polyester and the optional second polyolefin, for example fumed silica, but preferably the total amount of the siloxane polymer, the optional second polyester and the optional second polyolefin is at least 90 wt %, at least 95 wt %, at least 98 wt %, at least 99 wt % or 100 wt % with respect to the total amount of D).

Preferably, the amount of the siloxane polymer with respect to D) is 50 to 100 wt %.

Preferably, the amount of the second polyester with respect to D) is 0 to 50 wt %, for example 1 to 50 wt %.

Preferably, the amount of the second polyolefin with respect to D) is 0 to 50 wt %, for example 1 to 50 wt %.

Preferably, the total amount of A), B), C) and D) is at least 95 wt %, at least 98 wt %, at least 99 wt %, at least 99.9 wt % or 100 wt %.

E) Additives

The composition according to the invention may further comprise optional components different from the previously mentioned components of the composition, such as additives, wherein the total of the previously mentioned components and the optional components is 100 wt % of the total composition. Accordingly, the invention relates to a composition consisting of the previously mentioned components and the optional components.

The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The amount of the additives may e.g. be 0.1 to 5 wt %, for example 0.2 to 1 wt %, based on the total composition.

Properties of Composition

Preferably, the composition according to the invention has the composition according to the invention has a static friction of 0.30 to 0.70 according to ASTM D-3702 (plastic on plastic, pressure 40 kPa, velocity 50 mps, oscillation 30°/0.5 hertz, duration 120 min). The measurement may be made using LRI-1a automated tribometer. More preferably, the static friction is at most 0.60, at most 0.50 or at most 0.45.

Preferably, the composition according to the invention has the composition according to the invention has a dynamic friction of 0.10 to 0.25 according to ASTM D-3702 (plastic on plastic, pressure 40 kPa, velocity 50 mps, oscillation 30°/0.5 hertz, duration 120 min). The measurement may be made using LRI-1a automated tribometer. More preferably, the dynamic friction is at most 0.20, at most 0.18 or at most 0.15.

Preferably, the composition according to the invention has melt volume flow rate (MVR) of at least 5 cc/10 min, for example 5 to 20 cc/10 min or 20 to 40 cc/10 min, as determined by ISO1133 (2.16 kg, 265° C., 300 seconds).

Preferably, the composition according to the invention has melt volume flow rate (MVR) of at least 10 cc/10 min, for example 10 to 25 cc/10 min or 25 to 50 cc/10 min, as determined by ISO1133 (2.16 kg, 265° C., 900 seconds).

Preferably, the composition according to the invention has a shrinkage of at most 2%, more preferably at most 1.5%, more preferably at most 1.3%, more preferably at most 1.0%, as determined by ISO 294-4.

Preferably, the composition according to the invention has a notched impact strength of at least 5 $kJ/m^2$, more preferably at least 10 $kJ/m^2$, more preferably at least 20 $kJ/m^2$ or more preferably at least 30 $kJ/m^2$, as determined by ISO180 (23° C.) Preferably, the composition according to the invention has a tensile modulus of at least 1500 MPa, more preferably at least 1600 MPa, more preferably at least 1800 MPa as determined by ISO527.

Preferably, the composition according to the invention has a gloss of at least 50 gloss units, more preferably at least 75 gloss units, more preferably at least 90 gloss units, as determined by ISO2813 at a measurement angle of 60°.

Other Aspects

The composition of the invention may be obtained by a process comprising melt-mixing A), B), C) and D) and optionally the optional components by using any suitable means. Accordingly, the invention further relates to a process for the preparation of the composition according to the invention comprising melt mixing A), B), C) and D) and optional components. Preferably, the composition of the invention is made in a form that allows easy processing into a shaped article in a subsequent step, like in pellet or granular form. Preferably, the composition of the invention is in pellet or granular form as obtained by mixing all components in an apparatus like an extruder; the advantage being a composition with homogeneous and well-defined concentrations of the additives.

Suitable conditions for melt-mixing, such as temperature, pressure, amount of shear, screw speed and screw design when an extruder is used are known to the skilled person.

The invention further relates to an article comprising the composition according to the invention. Preferably, the article is an injection molded article.

In one embodiment, the article of the invention comprising a stud can suitably be used to interlock with another article of the invention comprising a receptacle for receiving the stud. For example, the stud of one article of the invention may be designed such that it can be removably attached to the protuberance of another article of the invention. For example, the stud and the protuberance may be designed for interlocking the articles, for example the stud and protuberance may be designed to form fit.

For purpose of the invention with stud is meant a protuberance projecting from a surface or a part.

The article of the invention is for example a building block, a hinge or a gear wheel.

In a special embodiment, the article of the invention comprises a stud for fitting into a complementary receptacle and comprises a receptacle which is complementary to the stud. Examples of such articles are building blocks, wherein the stud(s) from the top of one block fit(s) into the receptacle(s) on the bottom of the next block and the stud(s) from the next block fit into the receptacle(s) on the bottom of another block, etc.

The invention therefore also relates to an assembly of at least two articles of the invention, wherein at least one of the at least two articles comprises a stud and another of the at least two articles comprises a receptacle for receiving the stud.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Experiments

Following materials were used.

PET: copolymer of terephtalic acid, isophtalic acid and diethylene glycol, intrinsic viscosity of 0.800 dl/g as determined by according to ASTM D4603 and MVI of 20 dg/min (2.16 kg, 280° C.) according to ISO 1133 (SABIC® PET BC-112 as commercially available from SABIC)

POE: copolymer of ethylene and 1-octene, MFI of 5 dg/min according to ASTM D1238 (2.16 kg, 190° C.), density of 0.87 g/$cm^3$ according to ASTM D792

Compatibilizer: commercial name LOTADER AX 8840; copolymer of ethylene and glycidylmethacrylate, MFI of 5 dg/min according to ASTM D1238 (2.16 kg, 190° C.), density of 0.964 g/$cm^3$ according to ASTM 1183

Lubricant A: Accurel SI-735: Mixture of silicone oil (polydimethylsiloxane) with a viscosity of 30000 cSt and a porous HDPE carrier Lubricant B: Silicone oil (polydimethylsiloxane) with a viscosity of 1000 cSt Lubricant C: Genioplast S: Mixture of ultrahigh molecular weight siloxane polymer and fumed silica Lubricant 0: Ceraflour: ultrahigh molecular weight polyethylene Blends were prepared from components as shown in Table 1 by melt-mixing in a twin-screw extruder with a relatively short residence time and relatively mild conditions. The following properties were measured and summarized in Table 1.

TABLE 1

| Examples | | CEx 1 | Ex 2 | Ex 3 | CEx 4 | Ex 5 | Ex 6 | CEx 7 | CEx 8 |
|---|---|---|---|---|---|---|---|---|---|
| PET (high IV) | wt % | 90 | 90 | 90 | 90 | 90 | 90 | 90 | 90 |
| Engage 8200 | wt % | 8.9 | 8.9 | 8.9 | 8.9 | 8.9 | 8.9 | 8.9 | 8.9 |
| compatibilizer Lotader AX8840 | wt % | 1.1 | 1.1 | 1.1 | 1.1 | 1.1 | 1.1 | 1.1 | 1.1 |
| Total | | 100 | 100 | 100 | 100 | 100 | 100 | 100 | 100 |
| IRGANOX 1010 | wt % | 0.25 | 0.25 | 0.25 | 0.25 | 0.25 | 0.25 | 0.3 | 0.3 |
| IRGAFOS 168 | wt % | 0.25 | 0.25 | 0.25 | 0.25 | 0.25 | 0.25 | 0.3 | 0.3 |
| Lubricant A | wt % | 0 | 1.0 | 2.4 | | | | | |
| Lubricant B | wt % | | | | 1.0 | | | | |
| Lubricant C | wt % | | | | | 1.0 | 2.4 | | |
| Lubricant D | wt % | | | | | | | 1.0 | 2.4 |
| Decrease in friction of coefficient after 2 months | Y/N | N | N | N | Y | N | N | N | N |
| Surface appearance | Y/N | N | N | N | N | N | N | Y | Y |

TABLE 1-continued

| Examples | | CEx 1 | Ex 2 | Ex 3 | CEx 4 | Ex 5 | Ex 6 | CEx 7 | CEx 8 |
|---|---|---|---|---|---|---|---|---|---|
| defects (non-molten lubricant) | | | | | | | | | |
| MVR 265C/ 2.16 KG/ 300 sec | cc/10' | 19.5 | 19.2 | 15.7 | 16.3 | 16 | 13.7 | | 15 |
| Notched Impact Strength 23° C. | kJ/$m^2$ | 20 | 35 | 33 | 43 | 22 | 41 | 8 | 6 |
| Tensile Modulus | MPa | 1888 | 1919 | 1899 | 1878 | 1942 | 1835 | 2016 | 1940 |
| Shrinkage T-bar | % | 1.1 | 1.3 | 1.2 | 1.2 | 1 | 1 | 1 | 1.5 |
| HDT 1.8 MPa | ° C. | 63 | 64 | 65 | 64 | 63 | 63 | 63 | 62 |
| VICAT B120 | ° C. | 76 | 87 | 88 | 87 | 80 | 75 | 86 | 84 |
| Static friction (oscilation 30°, 0.5 hertz, 120 min) | Average mid + end | 0.84 | 0.60 | 0.36 | 0.49 | 0.65 | 0.58 | 0.48 | 0.65 |
| Dynamic friction (oscilation 30°, 0.5 hertz, 120 min) | Average mid + end | 0.36 | 0.20 | 0.11 | 0.18 | 0.23 | 0.19 | 0.30 | 0.28 |

The amounts of lubricants, Irganox 1010 and Irgafos 168 are wt part per 100 wt part of the total of polyester, polyolefin and compatibilizer.

The use of lubricants A-D led to a decrease in the static friction and the dynamic friction.

In CEx 4 in which lubricant B was used, the friction of coefficient measured after 2 months from the preparation of the sample was substantially lower than that measured for the sample just prepared.

In CEx 7-8 in which lubricant D was used, the lubricant did not completely mix within the blend and non-molten lubricant was visible. Surface appearance defects were noted on the samples.

In Ex 2-3 in which lubricant A was used and Ex 5-6 in which lubricant C was used, a homogeneous composition was obtained which showed a low friction of coefficient which was maintained after two months.

In Ex 5-6 in which lubricant C was used, the increase in the amount of the lubricant led to a small decrease in the friction. In contrast, in Ex 2-3 in which lubricant A was used, the increase in the amount of the lubricant led to a large decrease in the friction. Ex 3 with 2.4 wt % of the lubricant shows a very low friction.

The invention claimed is:

1. A composition comprising A) a first polyester, B) a first polyolefin, C) a compatibilizer and D) a lubricant, wherein D) comprises a siloxane polymer having a viscosity of at least 10000 cSt and an optional second polyester and/or an optional second polyolefin, the total amount of A) and B) with respect to the total composition is at least 80 wt %, the amount of C) with respect to the total composition is 0.1 to 15 wt % and the amount of D) with respect to the total composition is 0.1 to 5.0 wt % and wherein the amount of B) with respect to the total composition is at most 40 wt %, wherein C) comprises a copolymer of ethylene and a comonomer selected from the group consisting of an unsaturated carboxylic acid and an anhydrate of the unsaturated carboxylic acid;

an ester of the unsaturated carboxylic acid;

a glycidylester of an unsaturated monocarboxylic acid;

a monoglycidylester or polyglycidylester of an unsaturated polycarboxylic acid; and an unsaturated glycidylether;

a random terpolymer of ethylene, butylacrylate and maleic anhydride; or an ethylene-acrylate copolymer which includes an acrylate represented by formula (I) or (II) as a comonomer:

$$CH_2{=}CR^1{-}COO{-}(CH_2)_n{-}OH \quad (I)$$

$$CH_2{=}CR^1{-}COO{-}(CH_2)_m{-}CHOH{-}CH_2OH \quad (II)$$

wherein $R^1$ is H or C1-C5 linear or branched alkyl, n is an integer of 1-10 and m is an integer of 0-10, wherein the composition has a melt volume flow rate (MVR) of at least 5 cc/10 min, as determined by ISO1133 (2.16 kg, 265° C., 300 seconds).

2. The composition according to claim 1, wherein the siloxane polymer is selected from polyalkylsiloxanes, polyarylsiloxanes and polyalkylarylsiloxanes.

3. The composition according to claim 1, wherein the viscosity of the siloxane polymer is 10000 to 15,000,000 cSt.

4. The composition according to claim 1, wherein the amount of the siloxane polymer with respect to D) is 50 to 100 wt %.

5. The composition according to claim 1, wherein D) comprises the second polyolefin.

6. The composition according to claim 5, wherein D) is in an amount of 1 to 50 wt % with respect to C).

7. The composition according to claim 1, wherein the amount of A) with respect to the total composition is at least 50 wt %.

8. The composition of claim 7, wherein the amount of A) with respect to the total composition is at least 75 wt %.

9. The composition according to claim 1, wherein A) is selected from the group consisting of polyethylene terephthalate (PET) and polybutylene terephthalate (PBT) and a combination thereof.

10. The composition according to claim 1, wherein A) is a recycled polyethylene terephthalate.

11. The composition according to claim 1, wherein the amount of B) with respect to the total composition is at most 35 wt %.

12. The composition of claim 11, wherein the amount of B) with respect to the total composition is 5 to 22.5 wt %.

13. The composition according to claim 1, wherein B) is selected from the group consisting of a low density polyethylene (LDPE), a linear low density polyethylene (LLDPE), a high density polyethylene (HDPE), polypropylene (PP), an elastomeric copolymer of ethylene and an α-olefin having 4 to 10 carbon atoms, and a combination thereof.

14. The composition according to claim 13, wherein B) is an elastomeric copolymer of ethylene and an α-olefin having 4 to 10 carbon atoms having a density of 0.850 to 0.910 $g/cm^3$ according to ASTM D792.

15. The composition according to claim 14, wherein the composition has a static friction of 0.30 to 0.70 according to ASTM D-3702 (plastic on plastic, pressure 40 kPa, velocity 50 mps, oscillation 30°/0.5 hertz, duration 120 min) and/or a dynamic friction of 0.10 to 0.25 according to ASTM D-3702 (plastic on plastic, pressure 40 kPa, velocity 50 mps, oscillation 30°/0.5 hertz, duration 120 min).

16. The composition according to claim 1, where in the siloxane polymer is a polydimethylsiloxane.

17. The composition according to claim 1, wherein the viscosity of the siloxane polymer is at least 15,000 cSt and at most 1,000,000 cSt.

18. The composition according to claim 1, wherein the viscosity of the siloxane polymer is at least 20,000 cSt and at most 50,000 cSt.

19. The composition according to claim 1, wherein C) comprises a copolymer of ethylene and a glycidylester of an unsaturated monocarboxylic acid.

20. The composition according to claim 1, wherein C) comprises a copolymer of ethylene and glycidylmethacrylate.

* * * * *